No. 823,932. PATENTED JUNE 19, 1906.
D. CORCORAN.
DEVICE FOR MEASURING LIQUIDS.
APPLICATION FILED JUNE 5, 1905.
Fig-1-
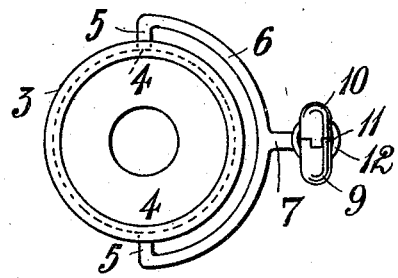
Fig-2-
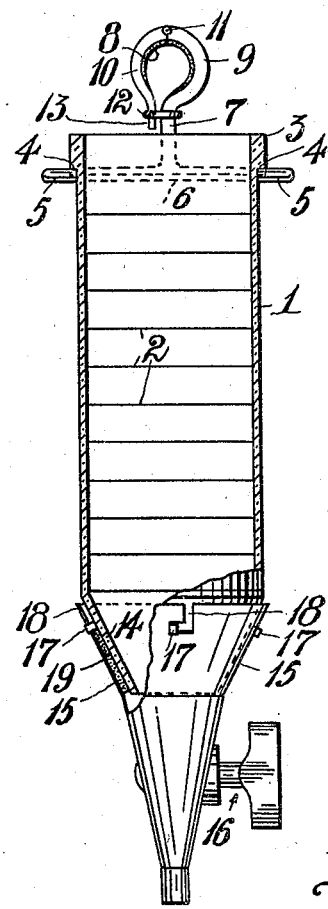

UNITED STATES PATENT OFFICE.

DANIEL CORCORAN, OF LAUNCESTON, TASMANIA, AUSTRALIA.

DEVICE FOR MEASURING LIQUIDS.

No. 823,932.　　　　　Specification of Letters Patent.　　　Patented June 19, 1906.

Application filed June 5, 1905. Serial No. 263,876.

*To all whom it may concern:*

Be it known that I, DANIEL CORCORAN, grocer, a subject of the King of Great Britain, residing at No. 33 George street, Launceston, in the State of Tasmania, Australia, have invented an Improved Device for Measuring Liquids, of which the following is a specification.

This invention relates to a device for accurately measuring liquids, which may be readily discharged of its contents.

It consists of a glass or other transparent tube marked with graduations and pivotally suspended from a clamping-bracket in such a manner as to retain the surface of the liquid therein at spirit-level. At the bottom of the tube is a detachable funnel provided with a cock by which the measured quantity may be transferred to another receptacle.

The appended sheet of drawings, illustrating the invention, comprises, in—

Figure 1, a plan, and Fig. 2 a central vertical section with parts in elevation.

Referring now to these drawings, 1 represents the tube, formed of crystal glass or other suitable transparent material and having graduations 2 cut or otherwise marked on the outside thereof, while 3 is the upper rim, somewhat thickened and recessed, as at 4, on diametrically opposite sides to form bearings for the pivots 5 of the gimbal-ring 6, which extends horizontally from a bracket 7. The bracket 7 is provided with a clamping-ring on the end of its vertical shank. This clamping-ring, which is adapted to grip any sized tap or pipe, is lined with india-rubber or other suitable material 8 and is formed in two parts 9 10, the latter being hinged, as at 11, to the rigid part 9 and adapted to be closed around the tap by a ring 12, sliding on the shank and engaging the straightened tail-piece 13 of said hinged part 10, while the elasticity of the india-rubber 8 insures a firm connection.

The bottom end of the tube is tapered, as at 14, and adapted to fit within the mouth of a funnel 15, which is provided with a cock 16 at its lower end. The funnel is readily attached to the tapered end 14 of the tube by studs 17 thereon, engaging bayonet-slots 18, formed in the mouth of said funnel, and the whole is made water-tight by the insertion of an india-rubber ring 19 or other packing between the said parts. The object of this is that said funnel may be readily removed for cleaning purposes or changed for one more suitable to the liquid being measured, such as one of different material or one of larger caliber when only large measurements are required. If it is desired to convey the measured liquid to a receptacle at a distance, a flexible tube may be attached to the lower end of the funnel.

By the foregoing it will be seen that no matter what position the supply-tap is in the device will always hang vertical and maintain a true spirit-level on the upper surface of the liquid, and thus insure accurate readings of the measurements of the liquids, while by the use of the cock in the funnel predetermined quantities may be withdrawn or the whole contents discharged into another receptacle without additional handling.

Having now particularly described and ascertained the nature of my said invention and in what manner the same is to be performed, I declare that what I claim is—

1. An improved device for measuring liquids, comprising a graduated tube, a gimbal-ring mounted in the upper portion thereof and provided with a bracket and clamping-ring, and a funnel at the lower end of said tube fitted with a discharge-cock.

2. An improved device for measuring liquids, comprising a graduated transparent tube having a detachable funnel at its lower end provided with a cock and recesses formed in the sides of its upper end, a bracket at its upper end having a gimbal-ring with pivots therefor, a vertical shank on said bracket, a clamping-ring on said shank lined with india-rubber and formed in two parts hinged together, and a closing-ring on said shank, substantially as set forth.

3. In an improved device for measuring liquids, a glass tube having a tapering end provided with studs, a detachable funnel provided with a discharge-cock and having bayonet-slots adapted to engage the said studs, and india-rubber packing between said funnel and said tapered end substantially as set forth.

In testimony whereof I have hereunto set my hand in presence of two subscribing witnesses.

DANIEL CORCORAN

Witnesses:
　CHARLES DUNBAR SHEW,
　ROGER DRUSPEAR DEAN.